Figure 1:
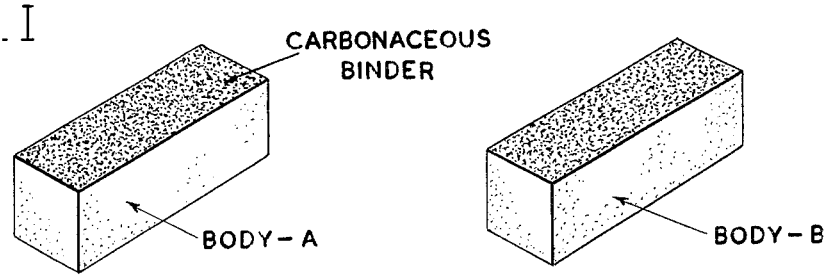
Figure 1:
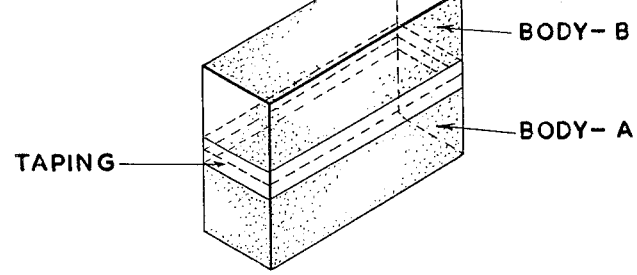
Figure 1:
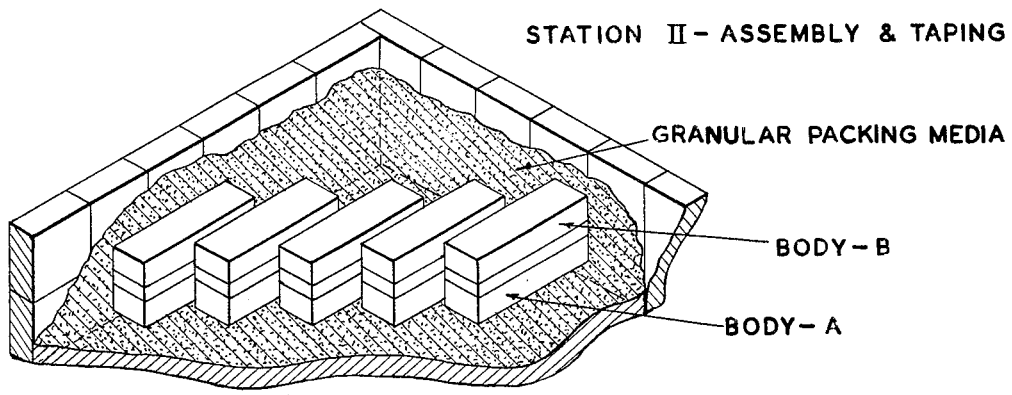
Figure 1:
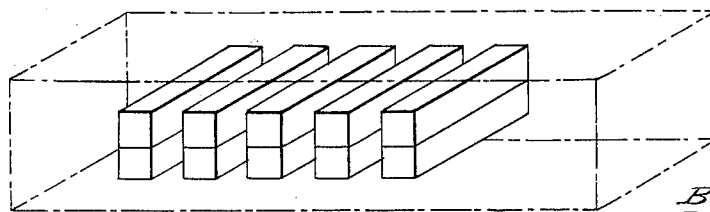

STATION I COATING

STATION II — ASSEMBLY & TAPING

STATION III — BAKING FURNACE

STATION IV — GRAPHITIZATION FURNACE

Inventors:
Bruce L. Bailey
Berch Y. Karagoz
Paul Peller

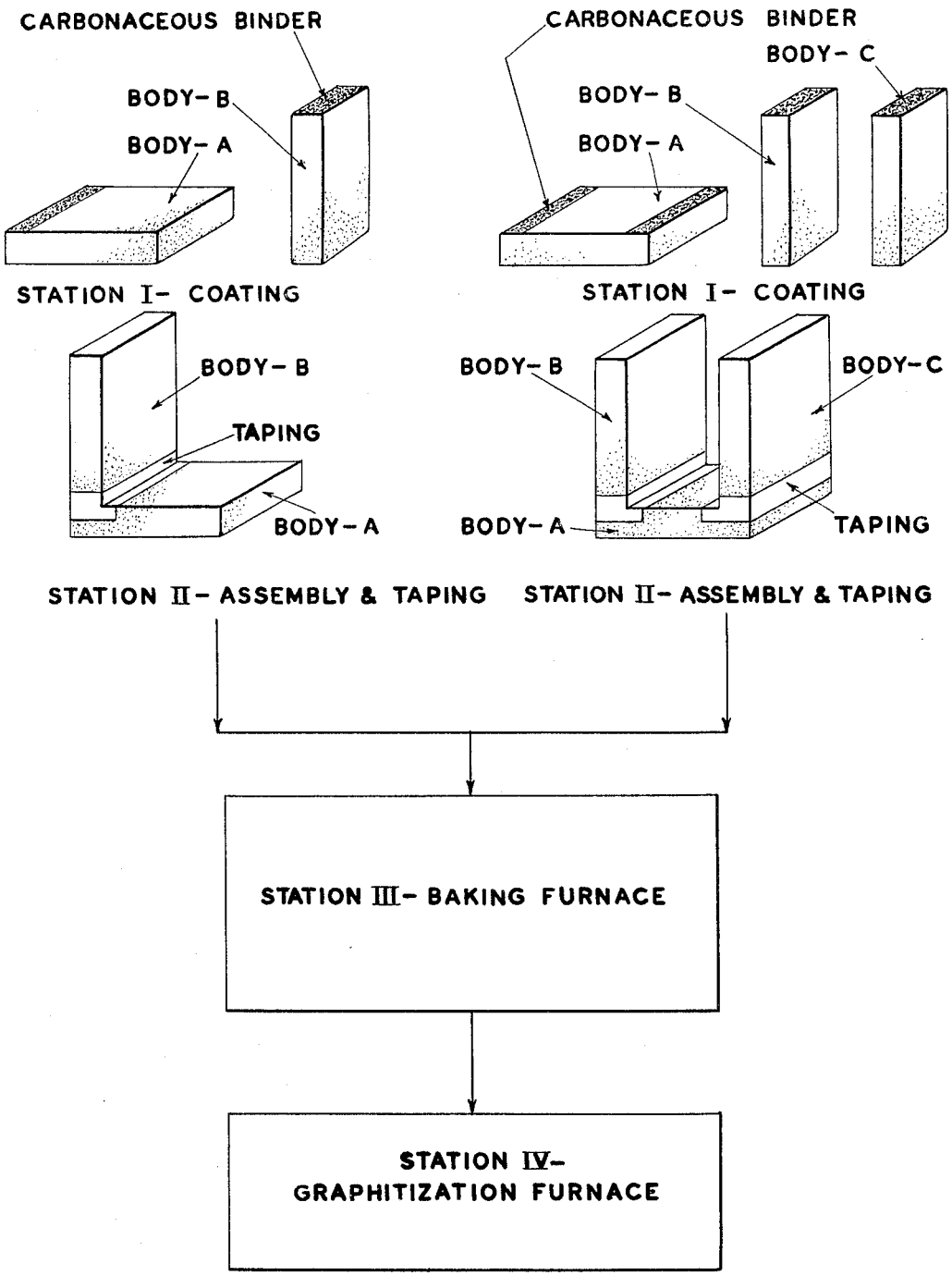

3,275,488
FABRICATION OF CARBON AND GRAPHITE BODIES
Bruce L. Bailey, Lewiston, Berch Y. Karagoz, Buffalo, and Paul Peller, Niagara Falls, N.Y., assignors to Great Lakes Carbon Corporation, a corporation of Delaware
Filed Aug. 5, 1960, Ser. No. 47,628
10 Claims. (Cl. 156—89)

This invention relates to a method for fabricating carbon and graphite bodies whose dimensions may be considerably greater or shapes more intricate than those which can be produced with existing extrusion or forming equipment.

There are numerous applications for carbon or graphite bodies of larger than ordinary dimensions. Some of these applications, such as in the aircraft and nuclear industries, require high strength at relatively high temperatures.

For example, in an aircraft industry process for producing honeycomb sandwich structures for aircraft and missile components, a key factor in the process lies in the use of a graphite bed in the brazing of these structures which are fabricated to extremely close tolerances. Since some of these components are extremely large in size, the dimensions of the graphite slabs or bed must also be very large, and considerably greater than the dimensions of graphite bodies produced with existing or conventional forming or extrusion equipment.

Another instance where a builtup carbon or graphite body of large dimension is useful is in nuclear reactors. For example, it has been proposed to cement four quadrants of graphite to form one cylinder and then cement several of these cylinders together and assemble them vertically to make a reactor core of the desired final diameter and height.

As a result of this demand for large carbon and graphite bodies, a considerable amount of attention has been devoted to the technique of building up such large bodies by cementing together smaller carbon bodies which have been baked or graphitized.

However, such a joining procedure as cementing previously baked or graphitized carbon bodies results in several disadvantages. For example, such a procedure is time and labor consuming. Also the resulting joint exhibits a much greater susceptibility to oxidation compared to that of the bodies being joined.

It is an object, therefore, of this invention to fabricate carbon or graphite bodies of large and/or intricate shape. It is an additional object to accomplish this in a useful, advantageous and novel manner.

It is another object of this invention to fabricate large, uniform carbon or graphite bodies which also possess high strength especially at high temperatures.

It is a further object of this invention to accomplish the foregoing using standard forming or extruding equipment.

These and other objects will become more apparent upon consideration of the drawings, the following discussion, examples and claims.

We have now found that an alternative solution to the problem of producing such large bodies lies in cementing or bonding the component pieces together while they are in the "green state," but after they have been extruded or molded, followed by a subsequent baking operation which permanently joins said bodies together.

In general the process comprises forming, as by extrusion, suitable mixture of carbonaceous particles and binder into desired dimensioned "green" bodies, coating a surface of at least one of said bodies which are to be joined with a carbonaceous bonding agent, joining the two bodies together with the bonding agent at their interface, surrounding the joint formed by the two pieces being joined with a support tape to prevent escape of binder and heating the pieces in a baking furnace. These and other details of the method are illustrated in the drawings and are also discussed in more detail hereinafter.

In the drawings, FIGURE I illustrates two formed green bodies A and B with a surface of body A coated with a carbonaceous binder. Green bodies A and B are then joined with the bonding agent at their interface, and the joint formed by bodies A and B are surrounded with a support tape to prevent escape of binder. The composite of the joined bodies A and B, or a number of such composites, is then packed into a baking furnace and surrounded with a packing material. Finally the composite of green bodies A and B, or the composites of such green bodies, is brought uniformly to the baked condition while in the baking furnace and while surrounded with the packing material or media. In other words, the bodies A and B are green to begin with and baked at the end and are in substantial identical condition at any time during the baking process from start to end and in-between. After the composite (or composites) is baked the baking furnace is cooled so that the packing material may be removed and the baked composite(s) recovered. The thusly joined and baked green bodies A and B or baked composite(s) may then optionally be graphitized.

FIGURE II illustrates possible variations covered by the invention such as the fabrication of composites of unusual geometrical configuration, such composites being difficult to make with conventional extruding or molding apparatuses.

The figures also illustrate that the various steps of the process such as forming the green bodies, coating them, assembling and taping them, and baking the composite(s) are carried out in separate and distinct operations.

We have further found that by this method the final large body not only possesses the requisite high strength at relatively high temperature but is, for all practical purposes, one continuous piece, and generally is much stronger especially at higher temperatures than a similar body made by cementing together previously baked or graphitized pieces.

The following examples will further point out and clarify the teachings and findings of this invention.

*Example 1*

A mixture was made up of 100 parts of carbon particles, at least 80% of which had a particle size between 10 mesh and 325 mesh, and 30 parts of coal tar pitch. This mixture was then formed into pieces of shaped green stock by extruding it through a die 24 inches wide and 30 inches high. After cooling, the corresponding faces of two extruded pieces or blocks from this mixture having the same dimensions and orientation and each 90 inches long were painted or coated with a bonding agent or cement comprised of about 65 parts of coal tar and about 35 parts of coal tar pitch leaving a minimum gap or cement thickness of approximately ⅛ inch when the faces of said blocks were placed together. By having the same orientation is meant that the pieces were aligned with the direction of extrusion each in the same direction.

The joint was taped entirely around its perimeter with a 4 inch strip of adhesive tape and the thus joined bodies placed in the bottom of a conventional baking furnace. The average modulus of rupture of the joint after baking to about 900° C. was 1600 p.s.i. and after graphitization was 1250 p.s.i.

*Example 2*

A mixture was prepared from 100 parts of carbon particles, at least 80% of which had a particle size between ½ inch and 325 mesh, and 25 parts of coal tar pitch. This mixture was extruded, joined and baked as in Example 1 resulting in a joint having a modulus of rupture after baking of 1100 p.s.i. and after graphitization of 950 p.s.i.

*Example 3*

An extrudable mixture was made up from 50 parts of coal and 50 parts of powdered carbon, at least 80% of which mixture had a particle size between 10 mesh and 325 mesh, and 36 parts of pitch. This mixture was extruded and cut into desired dimensions as in Example 1 and matching surfaces were joined with an all tar bonding agent. Upon baking, the average modulus of rupture of the joint was 1100 p.s.i.

Joint strengths of several other composite pieces were also determined. In many instances the strength of the baked base stock itself was less than the strength of the joint after the baking operation. In other words, the rupturing took place outside the plane of the joint.

Preferably the bonding agent will be applied to each of the matched faces or sides of the green bodies to be joined. In some instances however it may be expedient or desirable to apply the bonding agent to only one of the surfaces being joined. Frequently the faces or sides of the green bodies being joined will have the same lengths and widths, that is, will be correspondingly dimensioned. However, for some end products, particularly those of fairly intricate shape, this may not be the case.

The bonding agent will generally be applied at a temperature of about 130° C., the bodies to be joined being at about room temperature. Sufficient bonding agent is generally employed to leave a minimum gap or cement thickness of approximately ⅛ inch when the faces of said blocks are placed together. Maximum practical initial gap or joint thickness is about ¼ inch. After the blocks have been joined and any excess binder or bonding agent has been removed, a wide (approximately 4-inch) strip of support tape or cloth adhesive tape is applied entirely around the joint to prevent binder leakage prior to coking of the binder. Any suitable strong support tape may be used. In a preferred form the support tape is made from a material which is largely carbonized or volatilized during the subsequent baking operation. However, a support tape made from thin sheet steel or aluminum may also be used particularly when the surfaces being joined are of the same length and width. The block to be joined are then mechanically banded and blocked to prevent their shifting in handling. The assembled pieces are then packed in a baking furnace, and the composite body baked or heat treated and processed in a conventional manner. Conventional baking processes and baking furnaces are described on pages 249-260 in Mantell's "Industrial Carbon" published in 1946 by the D. Van Nostrand Company, Inc. of New York; they are also described in many other reference works and patents. All such baking furnaces employ packing materials to surround and support the bodies to be baked, and all such baking processes are characterized by the fact that the surrounded bodies are brought uniformly to a baked condition, such as according to a baking temperature curve illustrated in FIG. 90, page 258 of the cited Mantell Volume.

For best fusion results, the blocks and pieces to be united should be similar in their composition and physical characteristics although because of the high degree of intimate fusion that takes place between the bodies being joined in the present invention as compared to cementing baked or graphitized bodies, much wider variations in these properties of the pieces being joined are permissible than when employing the techniques of the prior art.

A particularly suitable and preferred bonding agent or cement consists of a mixture of approximately 35% coal tar pitch and 65% crude byproduct coal tar having a specific gravity of about 1.22. The percentages of this mixture may vary from about 15% to about 85% coal tar pitch and from about 85% to about 15% coal tar. The bonding agent may be any suitable substantially liquid or liquefiable carbonaceous material. It may consist of finely divided coking coal partly dissolved in an aromatic solvent such as anthracene oil or creosote, said mixtures being of such a viscosity that they may be applied like a paste or a paint. Or the bonding agent may essentially be a solid if it will liquefy, or it may be in liquid form initially so long as it is not so fluid as to be incapable of being retained in the joint. Preferably also the bonding agent should be substantially miscible with the binder employed in the extrudable mixture. The bonding agent should also be carbonaceous, that is have carbon in it and, if solid, should be liquefiable below its decomposition temperature. Suitable specific bonding agents which may be employed in the present invention are high volatile coking coal, coal tar, phenol-formaldehyde resins, polymerizable resins both of a thermosetting and of a thermoplastic nature, hydrogenated coal, asphalt, heavy coal tar fractions and suitable combinations of these.

Optionally, but in a preferred practice, the joined pieces are packed in the baking furnace with the plane of the joint horizontally disposed. Also in a preferred practice a hydrostatic pressure is exerted on the joint between the pieces of the composite body during the baking operation. Minimum hydrostatic pressures from about 5 to about 7 p.s.i. are preferred although pressures as low as 1 p.s.i. are of some effect.

The process of this invention produces a very strong bond between the united pieces. If desired, and for some particular applications, the composite body may then also be graphitized in a conventional manner after the baking operation.

It will be appreciated that the foregoing described methods of strongly bonding green bodies together during baking to produce large sized final carbonaceous bodies may also lend itself to applications other than fabrication of large blocks, such as to the fabrication of bodies having complex or intricate shapes.

It it also to be understood that the invention is not limited to the specific examples which have been offered merely as illustrative and that various modifications within the invention are possible. For example, both carbon and graphite materials can be used and the particle sizes of such materials may be varied considerably. The nature and condition of the surfaces to be joined may also be varied. Diamond sawed surfaces, or roughened surfaces, or interlocking surfaces or mating surfaces of different grain orientation may all be employed.

Therefore, we do not wish to be limited except as defined by the appended claims.

What is claimed is:

1. A method of fabricating carbonaceous bodies which comprises: (A) shaping carbonaceous mixtures into desired dimensioned "green" bodies by molding or extrusion; (B) coating a surface of at least one of said bodies which are to be joined with a carbonaceous bonding agent; (C) joining the two bodies together with the bonding agent at their interface; (D) surrounding the joint formed by the two pieces being joined with a support tape to prevent escape of binder; and (E) heating the pieces in a baking furnace in such a manner that the composite of the joined pieces is brought uniformly to a baked condition after surrounding said composite with a packing material.

2. A method according to claim 1 wherein said bonding agent coating on each surface coated is between about one-sixteenth and about one-eighth of an inch thick.

3. A method according to claim 1 wherein the bodies are extruded and the surfaces of the bodies being joined are correspondingly dimensioned and aligned in the direction of extrusion.

4. A method according to claim 1 wherein said green bodies are substantially similar in their composition and physical characteristics.

5. A method according to claim 1 wherein said bonding agent comprises a mixture of from about 85% to about 15% coal tar pitch and from about 15% to about 85% coal tar.

6. A method according to claim 1 wherein said bonding agent comprises a mixture of about 35% coal tar pitch and about 65% coal tar.

7. A method according to claim 1 wherein the pieces are placed in the baking furnace with the plane of their joint horizontally disposed.

8. A method according to claim 5 wherein said bonding agent is at about 130° C. and the bodies being joined are at about room temperature.

9. A method according to claim 7 wherein a hydrostatic pressure of at least 1 p.s.i. is exerted on the joint between the pieces of the composite body during the baking operation.

10. A method of fabricating carbonaceous bodies which comprises: (A) shaping carbonaceous mixtures into desired dimensioned "green" bodies by molding or extrusion; (B) coating a surface of at least one of said bodies which are to be joined with a carbonaceous bonding agent; (C) joining the two bodies together with the bonding agent at their interface; (D) surrounding the joint formed by the two pieces being joined with a support tape to prevent escape of binder; (E) heating the pieces in a baking furnace in such a manner that the composite of the joined pieces is brought uniformly to a baked condition after surrounding said composite with a packing material; and (F) graphitizing the thus joined pieces.

References Cited by the Examiner

UNITED STATES PATENTS

| | | | |
|---|---|---|---|
| 473,841 | 4/1892 | Hubin | 154—75 X |
| 974,008 | 10/1910 | Wolff | 154—75 X |
| 1,714,165 | 5/1929 | Gilbert | 23—209.3 X |
| 2,161,888 | 6/1939 | Rearick | 156—155 |
| 2,527,595 | 10/1950 | Swallen et al. | |
| 2,552,937 | 5/1951 | Cohen | 156—89 |
| 2,728,109 | 12/1955 | Bonnot | 204—294 X |
| 2,927,879 | 3/1960 | Jones | 161—182 |
| 2,937,980 | 5/1960 | Schmitt et al. | 204—294 X |

FOREIGN PATENTS 226,030  12/1959  Australia.

EARL M. BERGERT, *Primary Examiner.*

CARL KRAFT, *Examiner.*

M. E. ROGERS, H. F. EPSTEIN, *Assistant Examiners.*